US010895343B2

(12) United States Patent
Schmitt et al.

(10) Patent No.: US 10,895,343 B2
(45) Date of Patent: Jan. 19, 2021

(54) ALIGNMENT SAFETY JACK STAND

(71) Applicant: Federal-Mogul Motorparts LLC, Southfield, MI (US)

(72) Inventors: Steven D. Schmitt, Shobonier, IL (US); Russell Andert, Ballwin, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 0 days.

(21) Appl. No.: 16/521,692

(22) Filed: Jul. 25, 2019

(65) Prior Publication Data

US 2020/0032949 A1 Jan. 30, 2020

Related U.S. Application Data

(60) Provisional application No. 62/703,069, filed on Jul. 25, 2018.

(51) Int. Cl.
*F16M 11/20* (2006.01)
*F16M 11/14* (2006.01)

(52) U.S. Cl.
CPC ......... *F16M 11/2014* (2013.01); *F16M 11/14* (2013.01); *F16M 2200/08* (2013.01)

(58) Field of Classification Search
CPC ............... F16M 11/2014; F16M 11/14; F16M 2200/08; B60S 9/22; B60S 9/02; B60S 9/00
USPC ....... 248/644, 688, 676, 677, 678, 157, 419, 248/188.2, 188.3, 188.4, 352; 356/155
See application file for complete search history.

(56) References Cited

U.S. PATENT DOCUMENTS

| | | | | |
|---|---|---|---|---|
| 1,701,242 A | * | 2/1929 | Murdoch | B60S 9/22 254/424 |
| 2,168,906 A | * | 8/1939 | Leary | B60S 9/22 254/423 |
| 2,493,295 A | * | 1/1950 | Kron | F16M 11/38 248/352 |
| 3,317,218 A | * | 5/1967 | Rivolta | B60S 13/00 280/767 |
| 3,321,169 A | * | 5/1967 | Fowler | B60B 29/001 248/352 |
| 3,635,434 A | * | 1/1972 | Chartier | B60S 13/00 248/352 |
| 3,891,177 A | * | 6/1975 | Jerrel | B25H 1/0007 248/352 |
| 4,009,855 A | * | 3/1977 | Hoffmann | B66F 13/00 248/352 |
| 4,134,682 A | * | 1/1979 | Calk | G01B 11/27 33/203.18 |

(Continued)

*Primary Examiner* — Terrell L McKinnon
*Assistant Examiner* — Michael McDuffie
(74) *Attorney, Agent, or Firm* — Dickinson Wright PLLC

(57) ABSTRACT

The jack stand assembly includes a coupling plate with a plurality of openings for receiving the lugs of a wheel hub to fixedly attach the coupling plate with the wheel hub. The coupling plate is operably supported by a support structure which has an adjustable height. The support structure is configured to rotate about a vertical axis to allow the wheel hub to be rotated in a steering motion when the wheel hub is fixedly attached with the coupling plate. A bearing assembly is interposed between the coupling plate and the support structure to allow the wheel hub to rotate about a horizontal axis.

5 Claims, 11 Drawing Sheets

(56) References Cited

U.S. PATENT DOCUMENTS

| | | | | |
|---|---|---|---|---|
| 4,185,917 A * | 1/1980 | Alsina | G01B 11/275 | 248/481 |
| 4,432,145 A * | 2/1984 | Caroff | G01B 5/255 | 33/203.18 |
| 4,540,147 A * | 9/1985 | Lincourt | B66F 13/00 | 248/351 |
| 4,918,821 A * | 4/1990 | Bjork | G01B 11/275 | 33/203.18 |
| 5,033,198 A * | 7/1991 | Hastings | G01B 5/255 | 33/203.18 |
| 5,180,177 A * | 1/1993 | Maki | B25H 1/0007 | 248/352 |
| 5,471,754 A * | 12/1995 | Mieling | G01B 5/255 | 33/203.18 |
| 5,842,281 A * | 12/1998 | Mieling | G01B 5/255 | 33/203.18 |
| 6,684,516 B2 * | 2/2004 | Voeller | G01B 5/255 | 33/203 |
| 6,764,083 B2 * | 7/2004 | Bernard | B09B 3/00 | 248/352 |
| 6,813,015 B2 * | 11/2004 | Knoedler | G01M 11/067 | 356/155 |
| 7,314,207 B2 * | 1/2008 | Jones | F16L 3/02 | 182/182.3 |
| 7,543,830 B2 * | 6/2009 | Symiczek | B60S 13/00 | 280/79.11 |
| 7,661,198 B2 * | 2/2010 | Hara | G01B 21/26 | 33/203.15 |
| 8,141,837 B2 * | 3/2012 | Charters | B60S 11/00 | 248/352 |
| 2006/0060745 A1 * | 3/2006 | Nichols | B66F 13/00 | 248/352 |
| 2014/0145044 A1 * | 5/2014 | Ceravolo | F16M 11/26 | 248/157 |

* cited by examiner

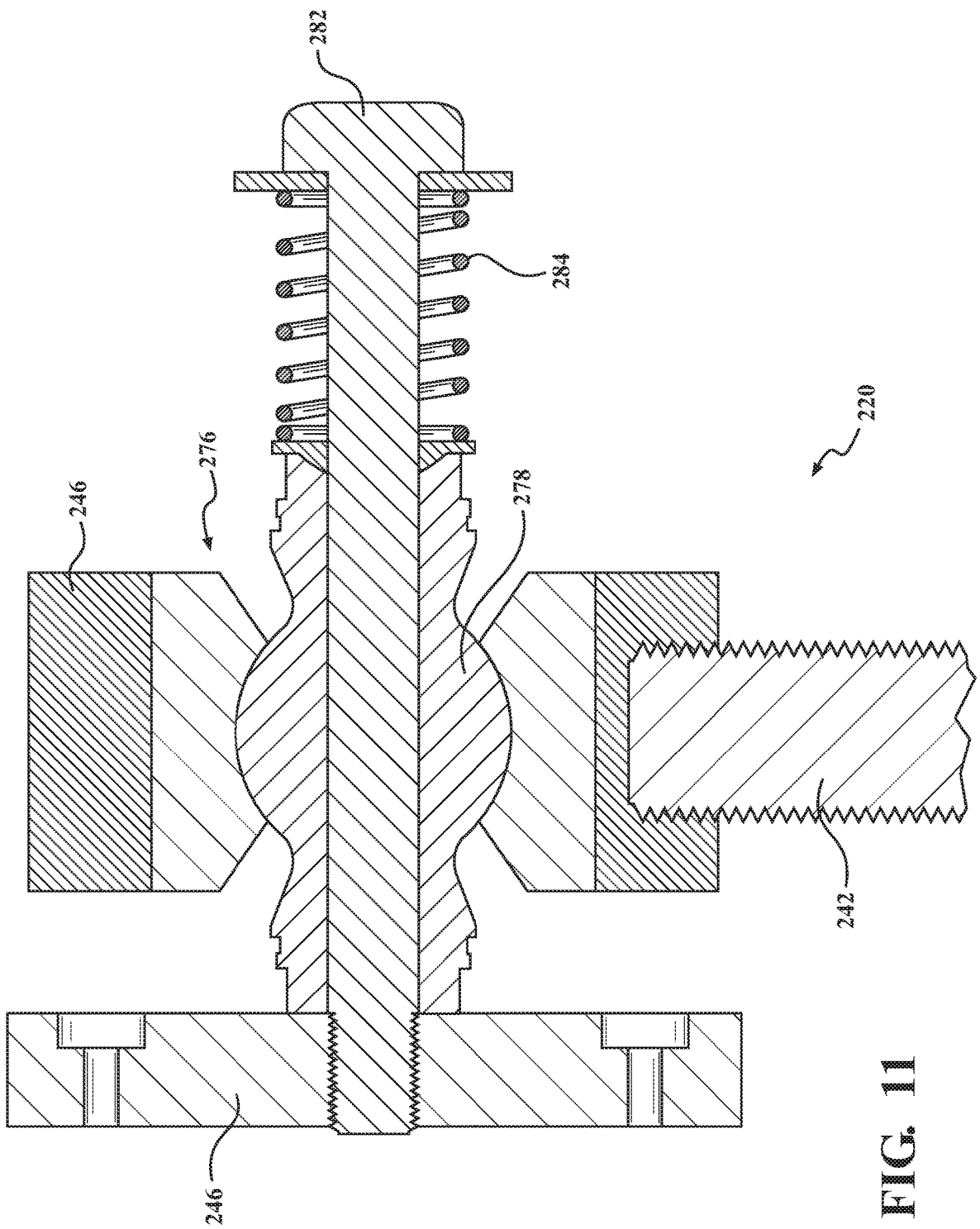

ALIGNMENT SAFETY JACK STAND

CROSS-REFERENCE TO RELATED APPLICATION

This application claims the benefit of U.S. Provisional Application No. 62/703,069, filed Jul. 25, 2018, the entire contents of which is hereby incorporated by reference.

BACKGROUND OF THE INVENTION

1. Field of the Invention

The present invention is related generally to an improved jack stand assembly which allows a user to more easily adjust camber, caster, and toe angles of a wheel hub.

2. Related Art

Vehicle suspension and steering systems are typically designed to optimize a vehicle's performance and efficiency. Three factors that vehicle designers specifically take into consideration when designing a suspension and steering system are camber angle, caster angle, and toe angle. The camber angle is the measurement of an angle of a wheel on a vehicle relative to a vertical axis. The caster angle is the measurement of a vertical axis defined by the suspension system relative to a vertical axis. The toe angle is a measurement of the wheel relative to a longitudinal axis of the vehicle.

Vehicles are designed so that the camber, caster, and toe angles of each of the wheels falls within specific predetermined ranges. When a vehicle is driven, forces acting on the wheels, such as from when the wheels encounter pot holes or another objects, may cause the wheels to depart from one or more of these predetermined ranges, which can have a negative impact on the vehicle's performance. Thus, as a part of routine maintenance, a mechanic will periodically check the camber, caster, and toe angles of the wheels and make any necessary adjustments to put these angles back in their respective predetermined ranges.

Jack stand assemblies have been designed to hold a wheel while a mechanic checks and, if necessary, adjusts the camber, caster, and toe angles of the wheel. However, there remains a continuing need for an improved jack stand assembly which provides a mechanic with more ranges of motion for manipulating a wheel while the wheel is being supported by the jack stand assembly.

SUMMARY OF THE INVENTION AND ADVANTAGES

One aspect of the present invention is related to a jack stand assembly for supporting a wheel hub of a vehicle. The jack stand assembly includes a coupling plate with a plurality of openings for receiving the lugs of a wheel hub to fixedly attach the coupling plate with the wheel hub. The coupling plate is operably supported by a support structure which has an adjustable height. The support structure is configured to rotate about a vertical axis to allow the wheel hub to be rotated in a steering motion when the wheel hub is fixedly attached with the coupling plate. A bearing assembly is interposed between the coupling plate and the support structure to allow the wheel hub to rotate about a horizontal axis.

The jack stand assembly of this aspect of the present invention provides advantages in allowing a user, such as a mechanic to more easily adjust the camber, caster, and toe angles of the wheel hub by allowing the mechanic to adjust the height of the jack stand and to rotate the wheel hub in steering and forward/backward driving motions. The jack stand assembly can also be manufactured at low cost and can be installed on the wheel hub very quickly and easily.

According to another aspect of the present invention, the support structure includes at least two pieces that are threadedly connected with one another to allow adjustment of the vertical height of the support structure by threading one of the pieces into or out of the other of the pieces.

According to yet another aspect of the present invention, the support structure includes a turnplate with a fixed platform and a movable platform and wherein the movable platform is able to move with low friction on the fixed platform.

According to still another aspect of the present invention, when the coupling plate is fixedly attached with the wheel hub, the vertical axis that the support structure is rotatable about is generally aligned with a pair of ball joints that support the wheel hub on the vehicle.

According to a further aspect of the present invention, the support structure includes a bearing housing with a post that is threadedly engaged with another component of the support structure, and the bearing housing has a through opening. The bearing is disposed in the through opening.

According to yet a further aspect of the present invention, the coupling plate has a projection which extends through the through opening of the bearing housing.

According to still a further aspect of the present invention, the support structure includes a support which is fixedly attached with the movable platform of the turnplate.

According to another aspect of the present invention, the support structure further includes a vertical arm which is fixedly attached with the support and extends in a vertical direction upwardly therefrom.

According to yet another aspect of the present invention, the support structure further includes a horizontal arm which is attached with the vertical arm and which has an opening that is threadedly engaged with the post of the bearing housing.

Another aspect of the present invention is related to a method of adjusting a wheel hub on a vehicle. The method includes the step of removing a wheel from the wheel hub. The method proceeds with the step of adjusting a vertical height of the jack stand assembly to a desired height. The method continues with the step of fixedly attaching a coupling plate of a jack stand assembly to the wheel hub. The method proceeds with the step of, with the coupling plate fixedly attached with the wheel hub, rotating the wheel hub in a steering motion and rotating the wheel hub in a forward or backward direction.

According to another aspect of the present invention, the step of adjusting the vertical height of the jack stand assembly includes threading a bearing housing of the jack stand assembly into or out of another component of the jack stand assembly.

According to yet another aspect of the present invention, the jack stand assembly further includes a turnplate with a fixed platform and a movable platform that is able to move with low friction on the fixed platform.

According to still another aspect of the present invention, the jack stand assembly further includes a bearing which allows the wheel hub to rotate in the forward and backward directions when the coupling plate is fixedly attached with the wheel hub.

BRIEF DESCRIPTION OF THE DRAWINGS

These and other features and advantages of the invention will become more readily appreciated when considered in connection with the following description of the presently preferred embodiments, appended claims and accompanying drawings, in which:

FIG. 11 is a cross-sectional and fragmentary view of a portion of a third embodiment of the jack stand assembly.

DESCRIPTION OF THE ENABLING EMBODIMENT

Figure 1:
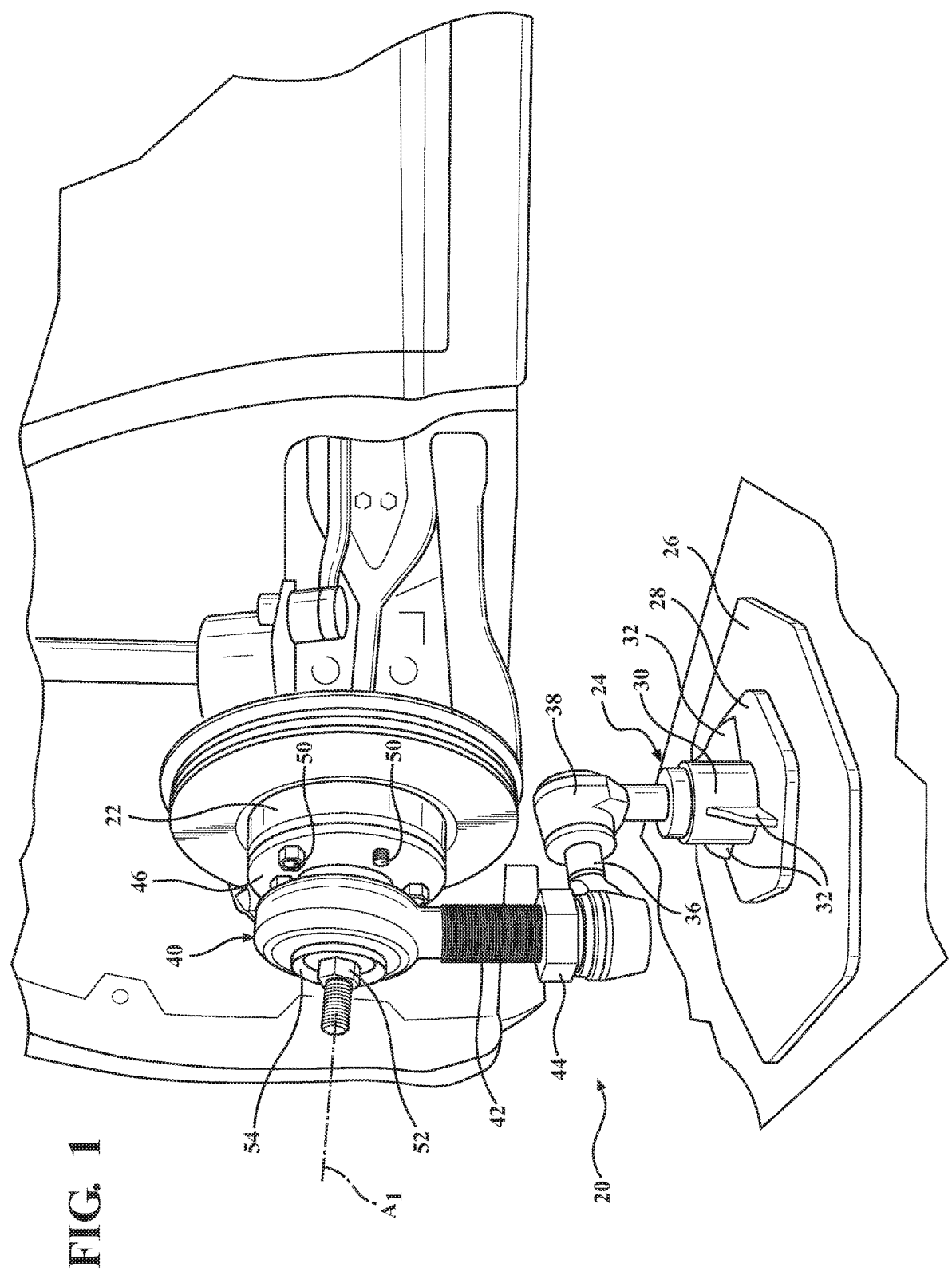
FIG. 1 is a perspective view showing a jack stand assembly constructed according to one aspect of the invention attached with a wheel hub of a vehicle.

Referring to the Figures, wherein like numerals indicate corresponding parts throughout the several views, one aspect of the present invention is related to an improved jack stand assembly 20. As discussed in further detail below, the jack stand assembly 20 is configured to directly engage with either a wheel hub 22 or a rotor of a vehicle and allow a mechanic to easily check and, if necessary, adjust the wheel's camber, caster, and toe angles while the wheel hub 22 is still attached with the jack stand assembly 20 and with the wheel hub 22 carrying a portion of the vehicle's weight, just as it does when a tire is attached with the wheel hub 22 and resting on the ground. In other words, in contrast to other known jack stand assemblies which leave the wheel hub unloaded during an alignment adjustment operation, the jack stand assembly 20 allows the wheel hub 22 to be loaded to an operational condition.

The jack stand assembly 20 includes a base 24 with a turnplate, which has a fixed platform 26 and a movable platform 28. The fixed platform 26 can be placed on a flat surface, such as the ground or a car lift. The movable platform 28 overlies the fixed platform 26 and can translate and/or rotate relative to the fixed platform 26 with low friction. The low friction interface which allows the movable platform 28 to slide on the fixed platform 26 is provided by a plurality of ball bearings 29 (shown in FIG. 7) which are captured within a cage between the platforms 26, 28.

The base 24 also includes a stand 30 which is fixedly attached with the movable platform 28 in a rigid (non-moveable) manner. The stand 30 is generally cylindrical in shape and extends vertically upwardly from the movable platform 28. A plurality of circumferentially spaced apart reinforcing ribs 32 extend from an outer surface of the stand 30 to the movable platform 28 to reinforce the stand 30. The stand 30 and the reinforcing ribs 32 are preferably made of metal, such as steel or an alloy steel, and are preferably attached with the movable platform 28 via welding.

A joint 38 is located at a top end of the stand 30 and interconnects the stand with a horizontal arm 36 which extends transversely to the vertical direction, i.e., parallel to the ground. The joint 38 has a horizontally extending opening which receives a portion of the horizontal arm 36 to fixedly attach these components. This connection between the horizontal arm 36 may either be permanent (such as through welding) or adjustable, such as with threads. However, the joint 38 is able to rotate relative to the stand 30 about a vertical axis to allow the horizontal arm 36 to pivot about about this vertical axis. A bearing may be interposed between the joint 38 and the stand 30 to allow this rotation.

The horizontal arm 36 extends from the joint 38 to a distal end which has a vertical opening that is internally threaded (female threads). A vertical shaft 42 is threadedly engaged with the internal threads at the end of the horizontal arm 36. A bearing housing 40, which has a shape that is similar to an eye bolt, is located at a top end of the vertical shaft 42 and contains a bearing. The bearing has an opening which extends along a horizontal axis $A_1$. The threaded engagement between the vertical shaft 42 and the horizontal arm 36 allows the bearing housing 40, the bearing, and the horizontal axis $A_1$ to be selectively adjusted upwardly and downwardly by rotating the bearing housing 40 relative to the horizontal arm 36, thereby threading the vertical shaft 42 into and out of the horizontal arm 36. A nut 44 is also threaded onto the vertical shaft 42 between the bearing housing 40 and the horizontal arm 36. Tightening the nut 44 against the horizontal arm 36 has the effect of fixing the bearing housing 40 with the horizontal arm 36 by preventing further rotation of the bearing housing 40. Rotation of the bearing housing 40 and vertical shaft 42 can be re-enabled by loosening the nut 44 to back it off of the horizontal arm 36. The bearing housing 40 is preferably made of metal, such as steel or an alloy steel and may be shaped through any suitable operation.

Figure 5:
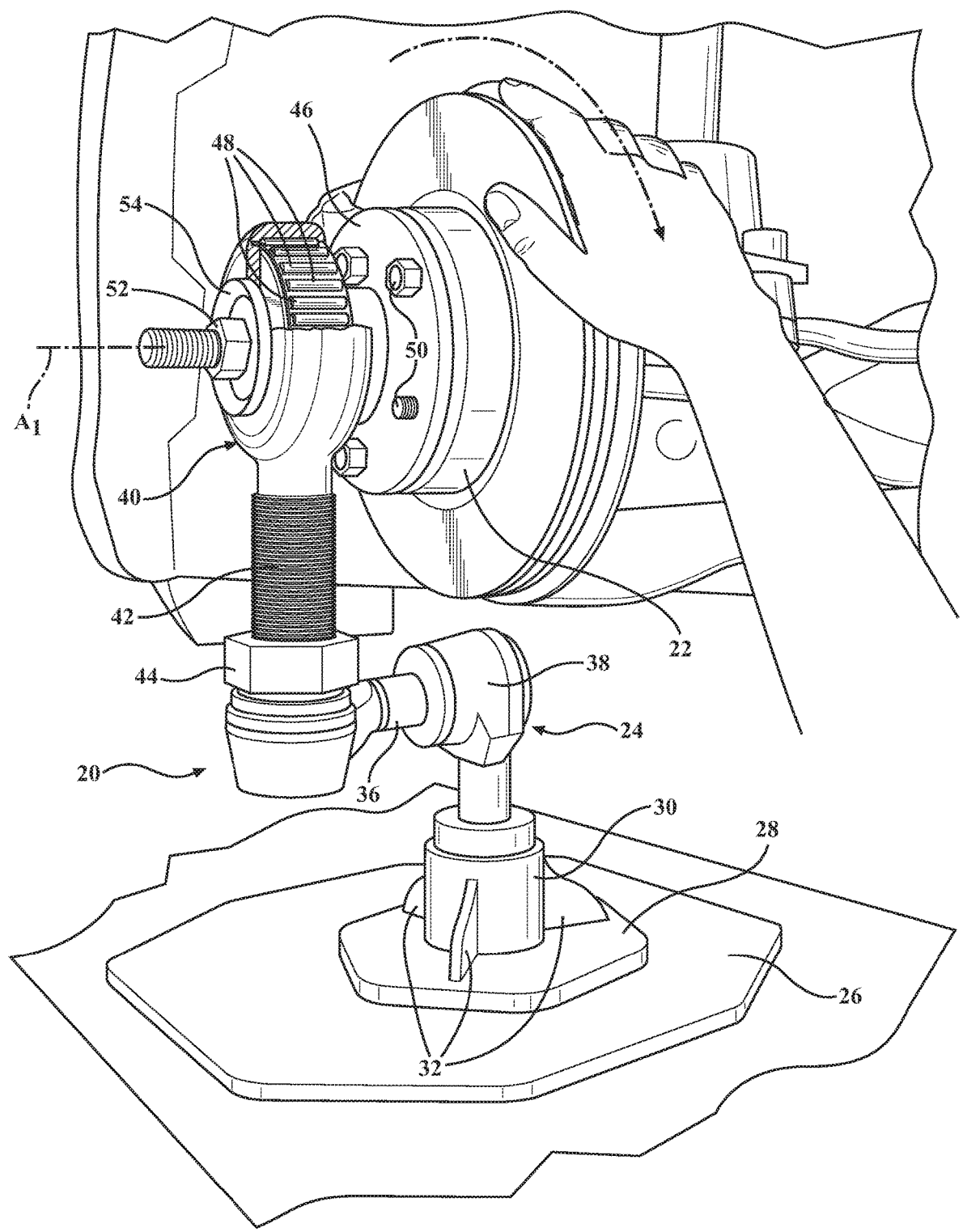
FIG. 5 is a perspective view of the jack stand assembly attached with a wheel hub and illustrating that the wheel hub can be rotated and also showing a bearing housing in being partially broken away to illustrate bearings contained therein.
Figure 6:
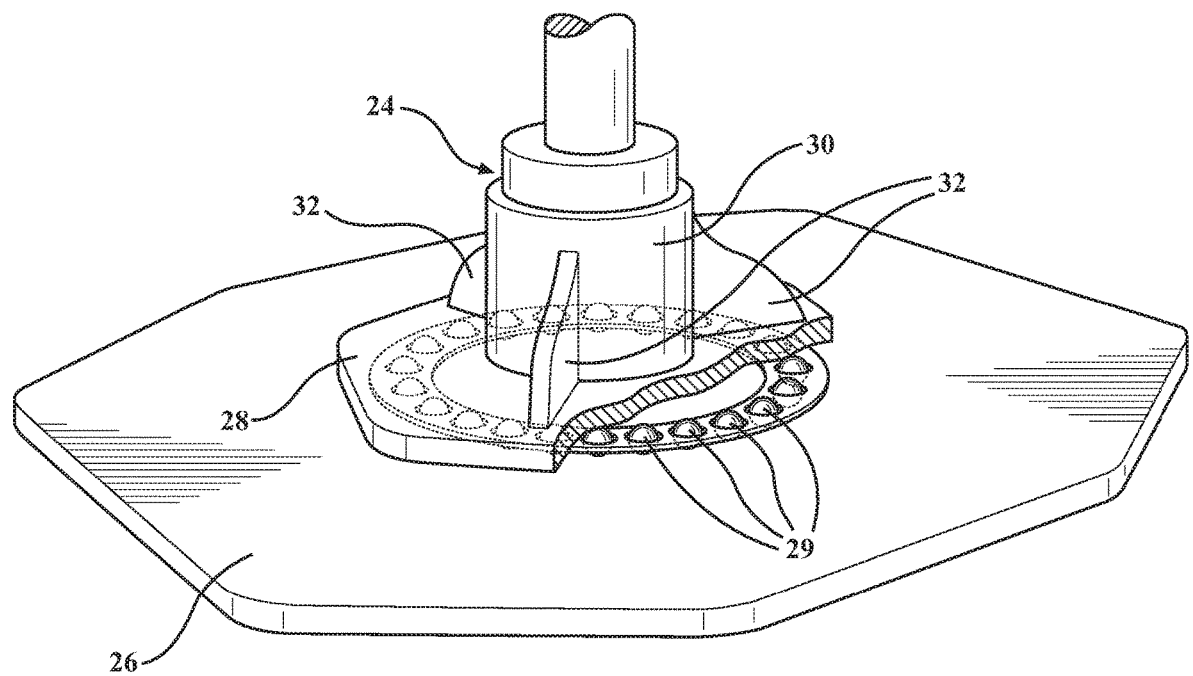
FIG. 6 is an enlarged and fragmentary view of a portion of the jack stand assembly of FIGS. 1-5.

As shown in FIG. 5, the jack stand assembly 20 further includes a coupling plate 46 with a pilot (or cylindrical projection) that extends along the horizontal axis $A_1$ through the through opening of the bearing housing 40 and through the bearing. In the exemplary embodiment, the bearing is a needle bearing which includes a plurality of cylindrically shaped needle rollers 48. The rollers 48 are configured to roll against inner and outer races of the bearing to enable rotation of the coupling plate about the horizontal axis $A_1$. The pilot of the extends to a threaded end, and a nut 52 and a closing plate 54 hold the coupling plate 46 in place with the bearing housing 40. In alternate embodiments, the bearing could be a ball bearing or any suitable type of bearing which allows the coupling plate to rotate with low friction about the horizontal axis $A_1$.

The coupling plate 46 also has a mounting portion which is disc shaped and has a plurality of circumferentially spaced apart holes that are located radially outwardly of the horizontal axis $A_1$. The spacing and number of holes match the spacing and number of a plurality of lugs 50 on the wheel hub 22 to allow the lugs to be inserted through the holes. A plurality of lug nuts can then be tightened onto the lugs 50 to secure the wheel hub 22 with the mounting portion of the coupling plate 46. The coupling plate may have, for example, four, five, or six holes, depending on the type of wheel hub it is to be attached with.

The coupling plate 46 can be detached from the jack stand assembly 20 by removing the nut 52 and the closing plate 54 and sliding the pilot out of the bearing 48. The jack stand assembly 20 may be packaged with a plurality of different coupling plates that have different opening patterns for attachment to the wheel hubs of different vehicles, i.e., wheel hubs with differing bolt patterns. A different coupling plate can be quickly and easily joined with the jack stand assembly 20 by inserting the pilot of the new coupling plate into the bearing 48, inserting the closing plate 54 onto the pilot, and tightening the nut 52 down onto the closing plate 54.

To use the jack stand assembly 20, a user first raises the vehicle with a separate jack (not shown), such as one that lifts the vehicle by its frame to raise one of the vehicle's wheels into the air. Next, the user removes a wheel and tire combination (not shown) from the wheel hub 22 and positions the jack stand assembly 20 underneath the wheel hub 22. At this stage, a brake rotor can be either removed from the wheel hub 22 or left in place. The user then rotates the bearing housing 40 to put the mounting portion of the coupling plate 46 at a desired height which will simulate the height of the wheel hub 22 when the wheel is affixed thereto and the tire is resting on the ground. The user then inserts the lugs 50 into the holes of the mounting portion of the coupling plate 46 and tightens the lug nuts onto the lugs 50. If the rotor is left on the wheel hub 22 then the mounting portion of the coupling plate 46 will sandwich the rotor between the coupling plate 46 and the wheel hub 22. The low friction interface between the fixed and moveable platforms 26, 28 allows the user to easily move the coupling plate 46 onto the lugs 50 of the wheel hub 22.

Figure 2:
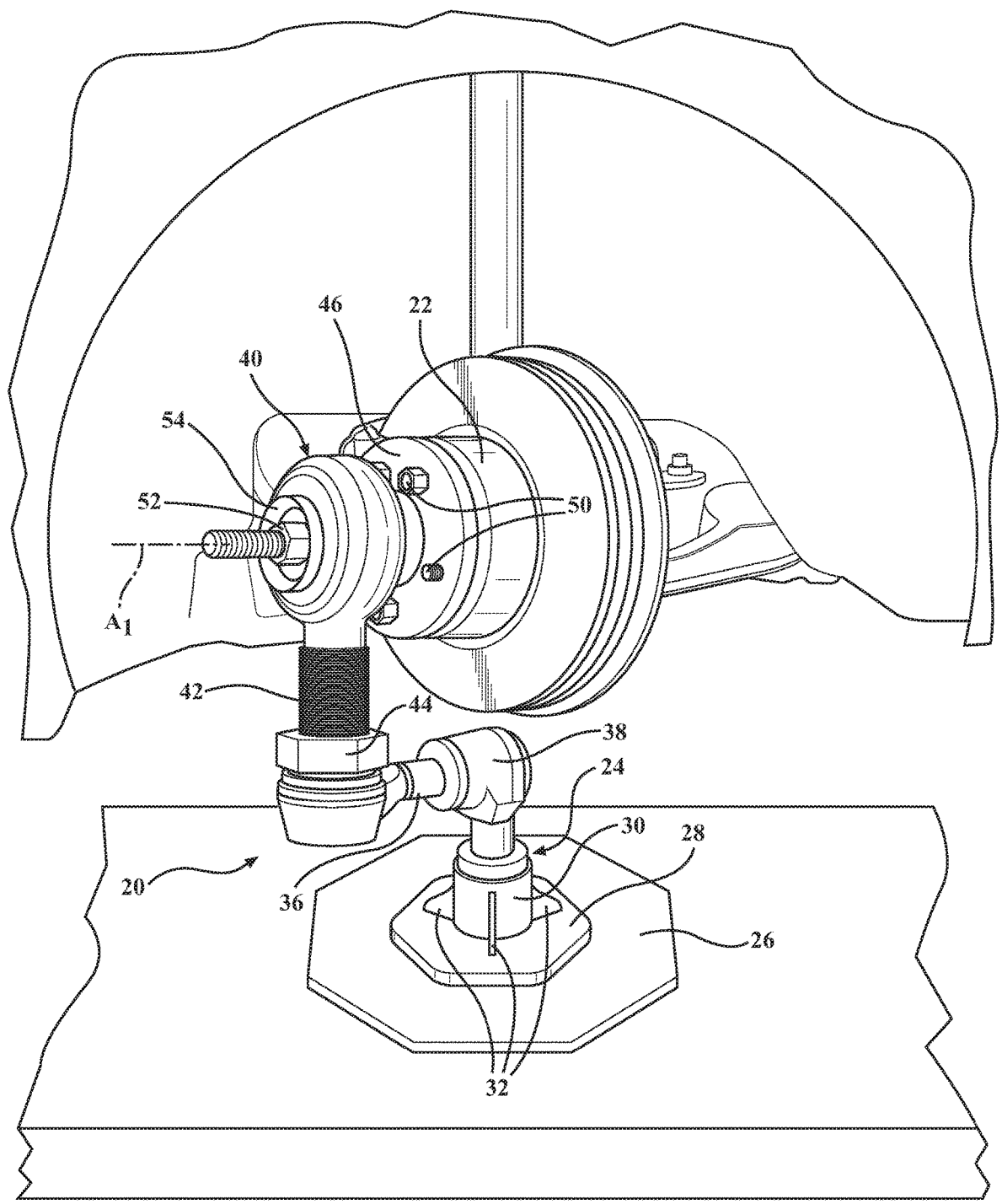
FIG. 2 is another perspective view showing the jack stand assembly attached with the wheel hub and with the wheel hub being turned in one steering direction.
Figure 3:
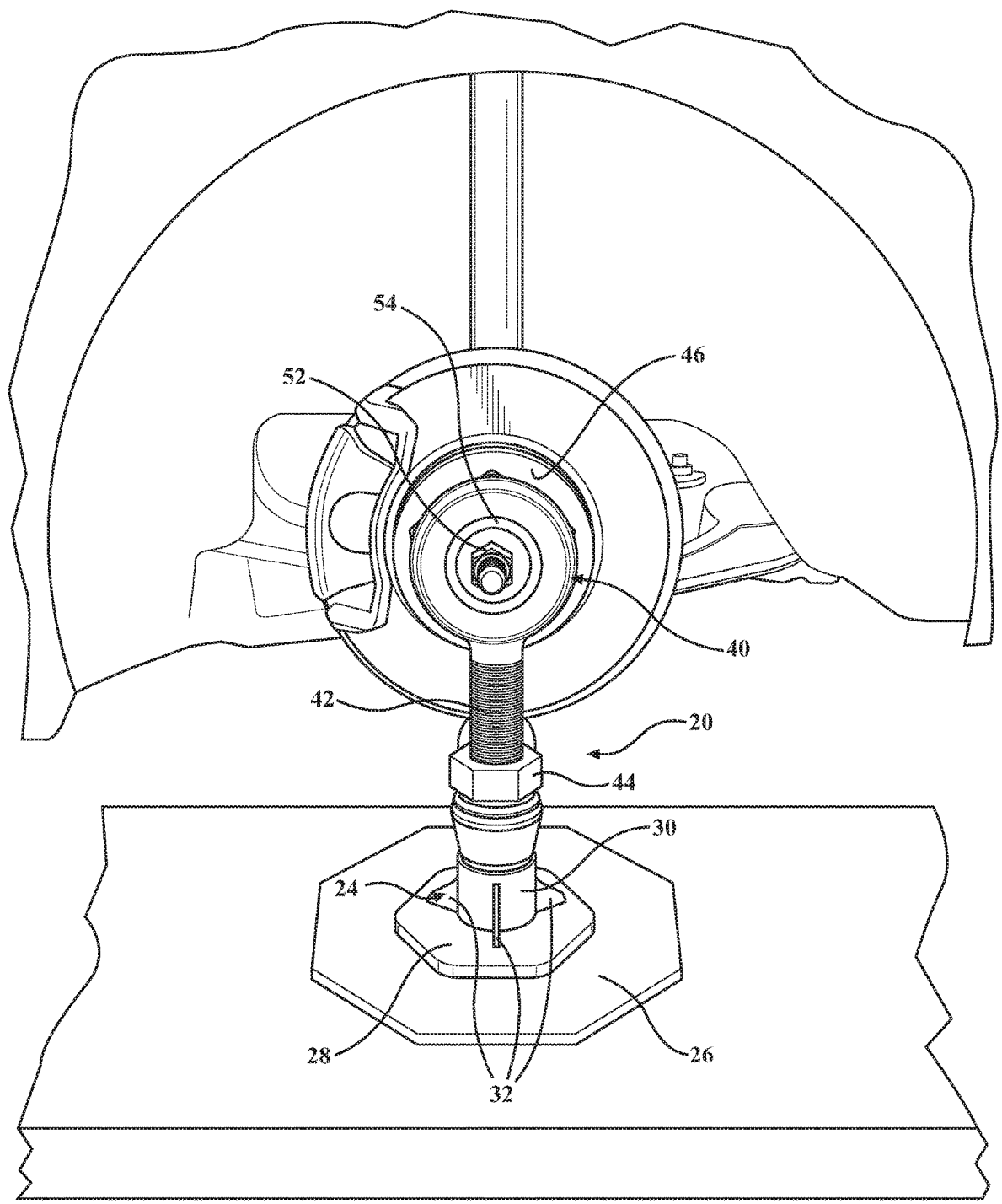
FIG. 3 is yet another perspective view showing the jack stand assembly attached with the wheel hub and with the wheel hub being in a straight steering direction.
Figure 4:
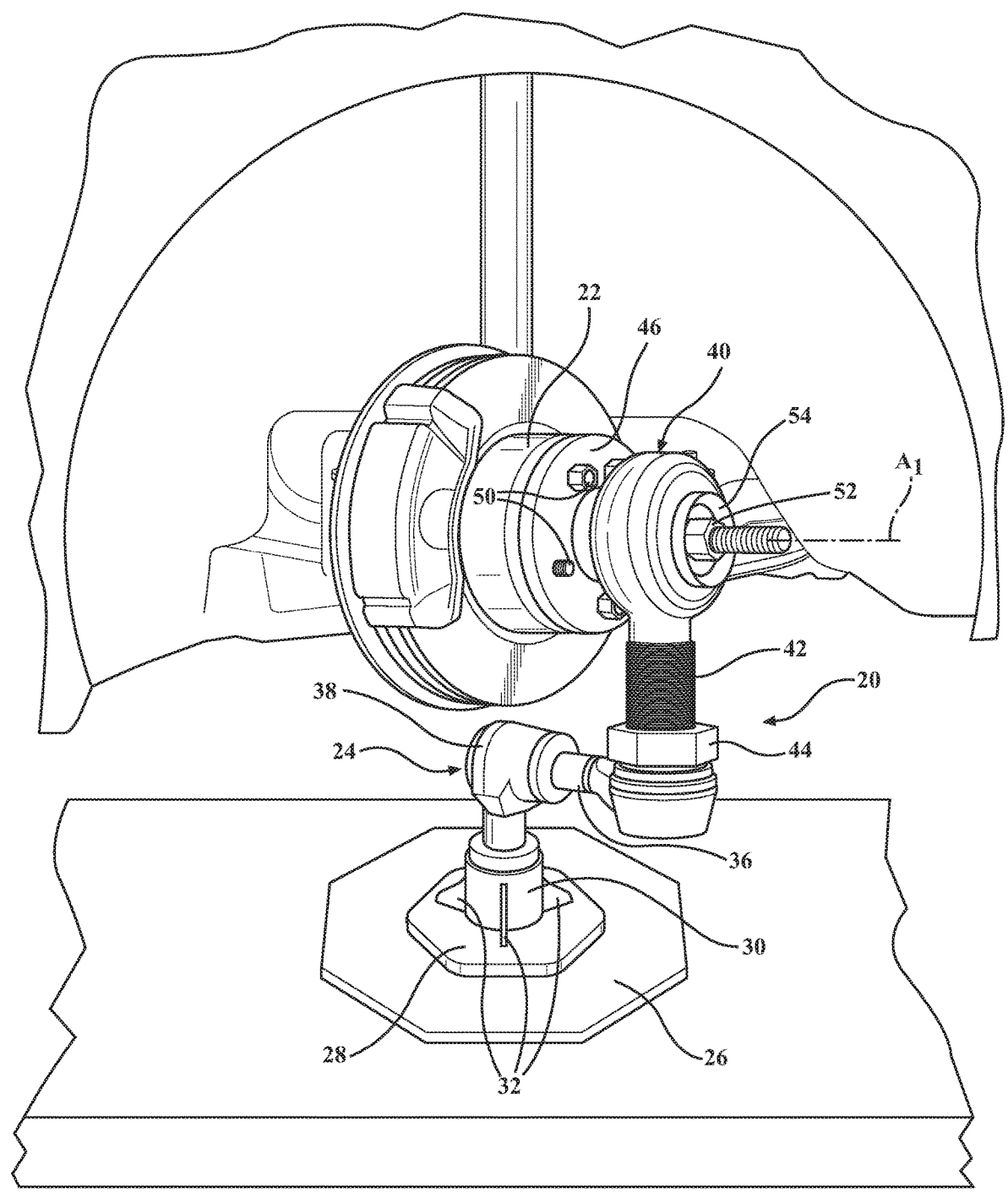
FIG. 4 is still another perspective view showing the jack stand assembly attached with the wheel hub and with the wheel hub being turned in an opposite steering direction from FIG. 2.
Figure 7:
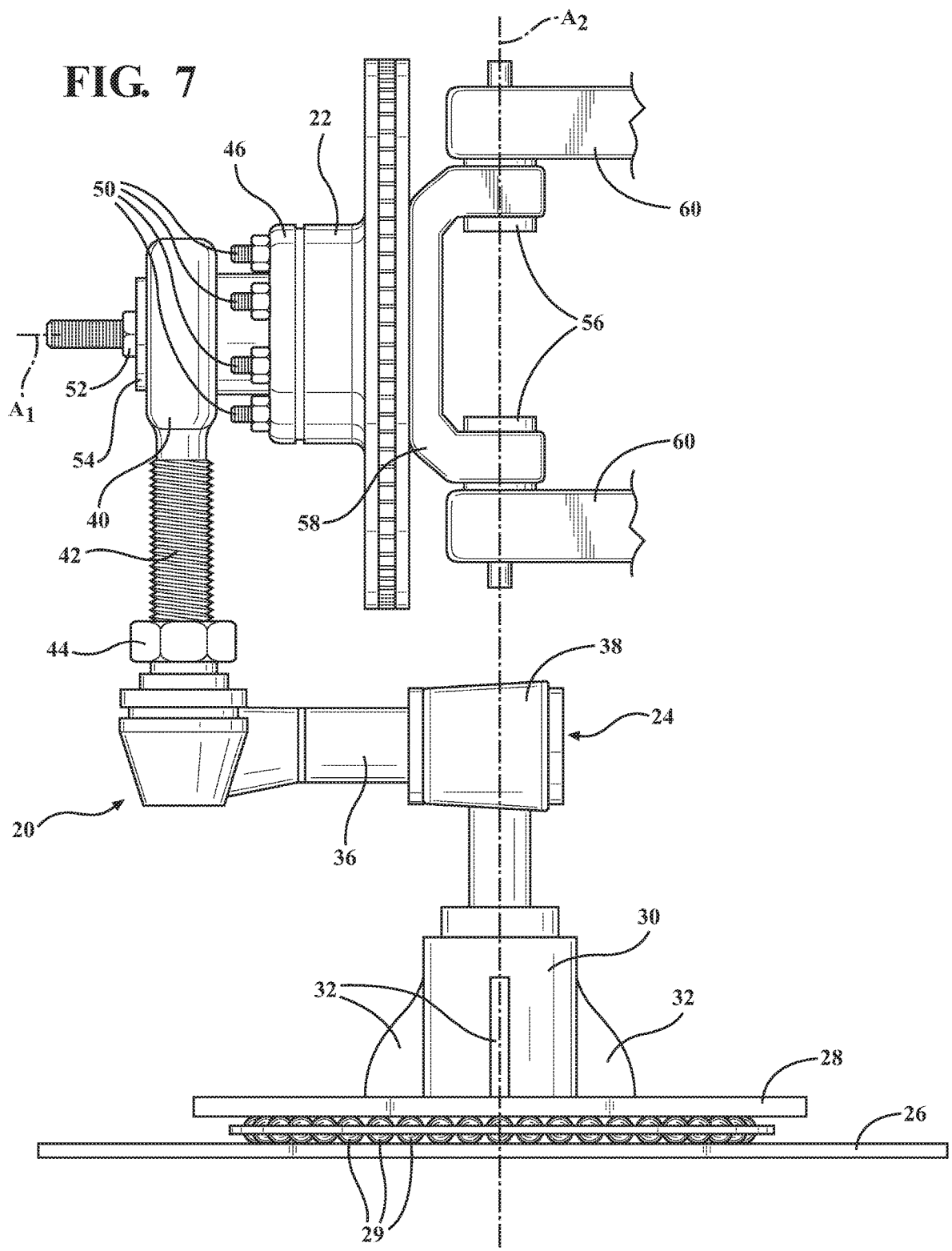
FIG. 7 is a side view showing the jack stand assembly attached with the wheel hub.

As shown in FIG. 7, when the coupling plate 46 is fixedly attached with the wheel hub 22, the vertical arm 36 and the support 30 are generally aligned along a vertical axis $A_2$ with a pair of ball joints 56 which connect a steering knuckle 58 with suspension components (such as a pair of control arms 60). The general axial alignment of the stand 30 with the ball joints 56 allows the wheel hub 22 to be generally freely rotated in left and right steering motions through rotation of the joint 38 on the stand 30. The turntable 26, 28 also allows for slight translational motions during this steering motion. FIG. 2 shows the wheel hub 22 after having been turned in a right steering direction, and FIG. 4 shows the wheel hub 22 after having been turned in a left steering direction. The ability to "steer" the wheel hub 22 while it is on the jack stand assembly 20 makes the process of checking and, if necessary, adjusting the camber, caster, and toe angles of the wheel hub 22 easier and allows for a more accurate alignment of the front wheels. The bearing 48 in the bearing housing 40 also allows the wheels to, with low friction, rotate in forward and backward directions while the jack stand assembly 20 is attached with the wheel hub 22. This feature additionally may be beneficial to a user performing an alignment procedure.

During a conventional alignment procedure using known equipment, a vehicle is raised on an alignment rack, sensors/targets are fixedly attached with the vehicle's wheels, and the sensors communicate with cameras that are placed in front of the alignment rack. The jack stand assembly 20 preferably also includes a plurality of sensors integrated thereto and which are fixedly attached with the various components, e.g., joint 38, the bearing housing 40, and/or the coupling plate 46. The sensors preferably include orientation sensors, potentiometers, and/or accelerometers. The sensors allow a user to perform the alignment procedure without having to fixedly attach the targets with the wheels or raise the vehicle up on an alignment rack. Thus, less equipment is required, and the entire alignment procedure can occur on a level surface. The sensors preferably communicate with a controller (such as a computer or a smart phone or any other handheld device) via Bluetooth® or any suitable wireless communication means.

Figure 8:
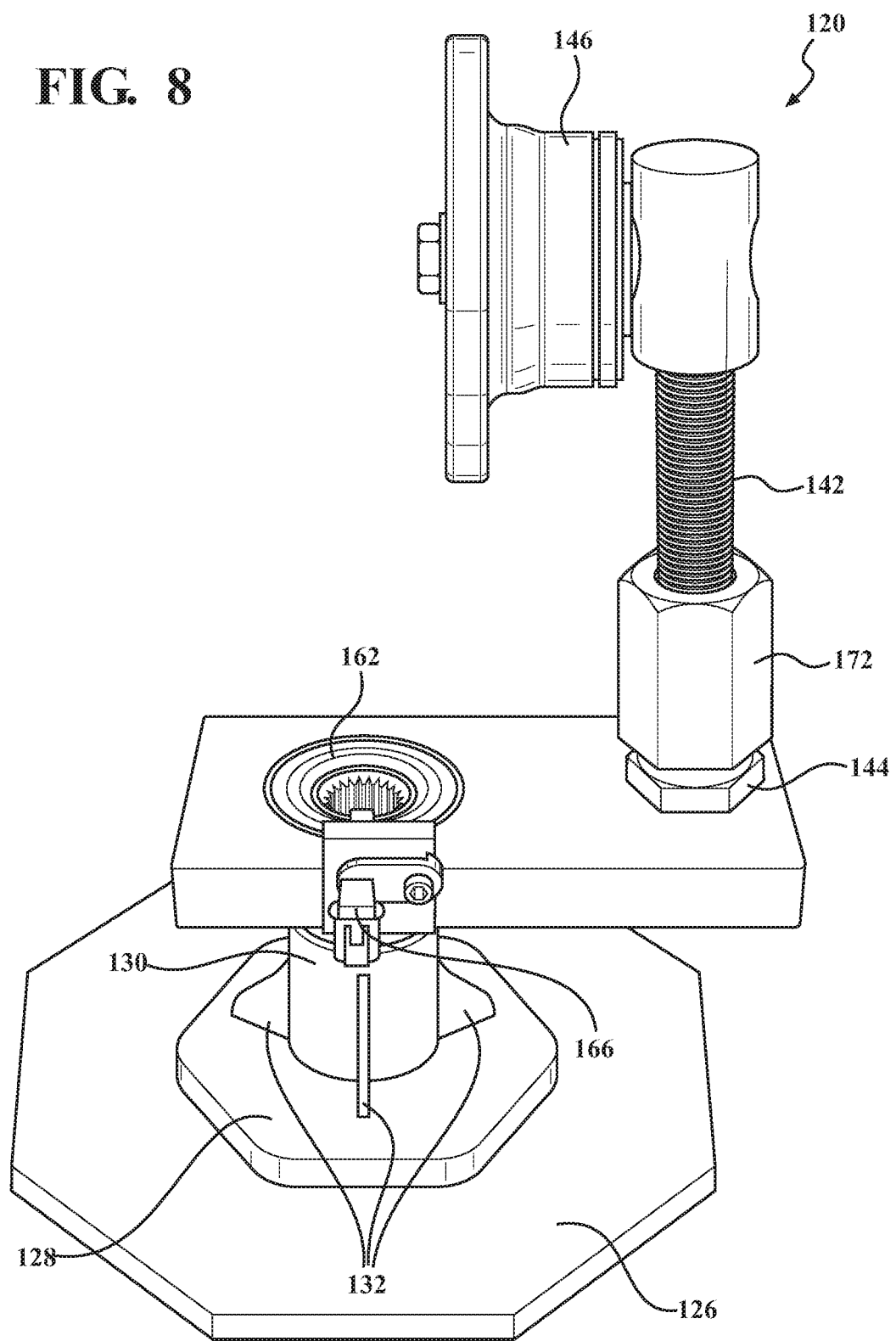
FIG. 8 is a perspective elevation view of a second embodiment of the jack stand assembly.
Figure 9:
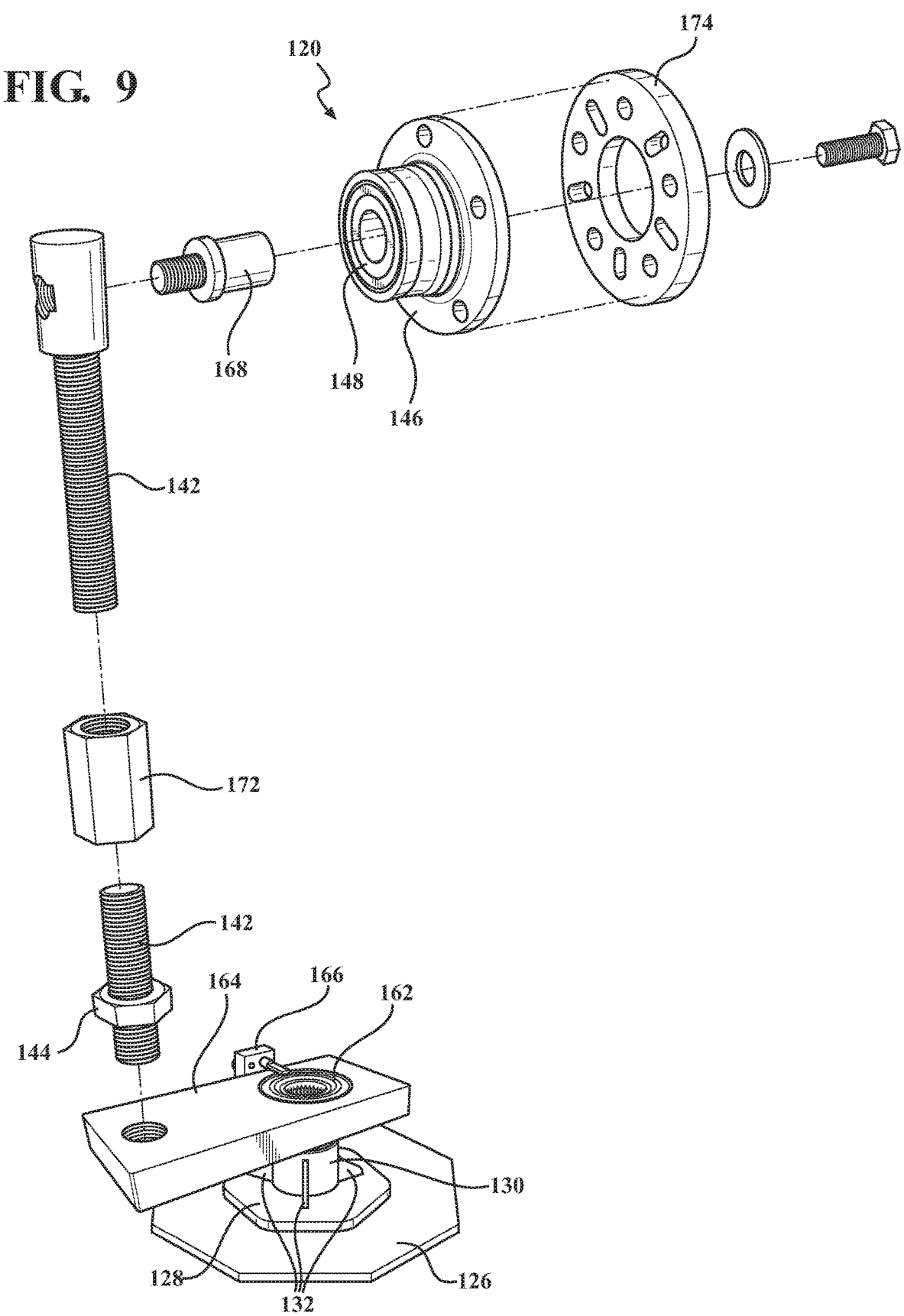
FIG. 9 is a partially exploded view of the second embodiment of the jack stand assembly.
Figure 10:
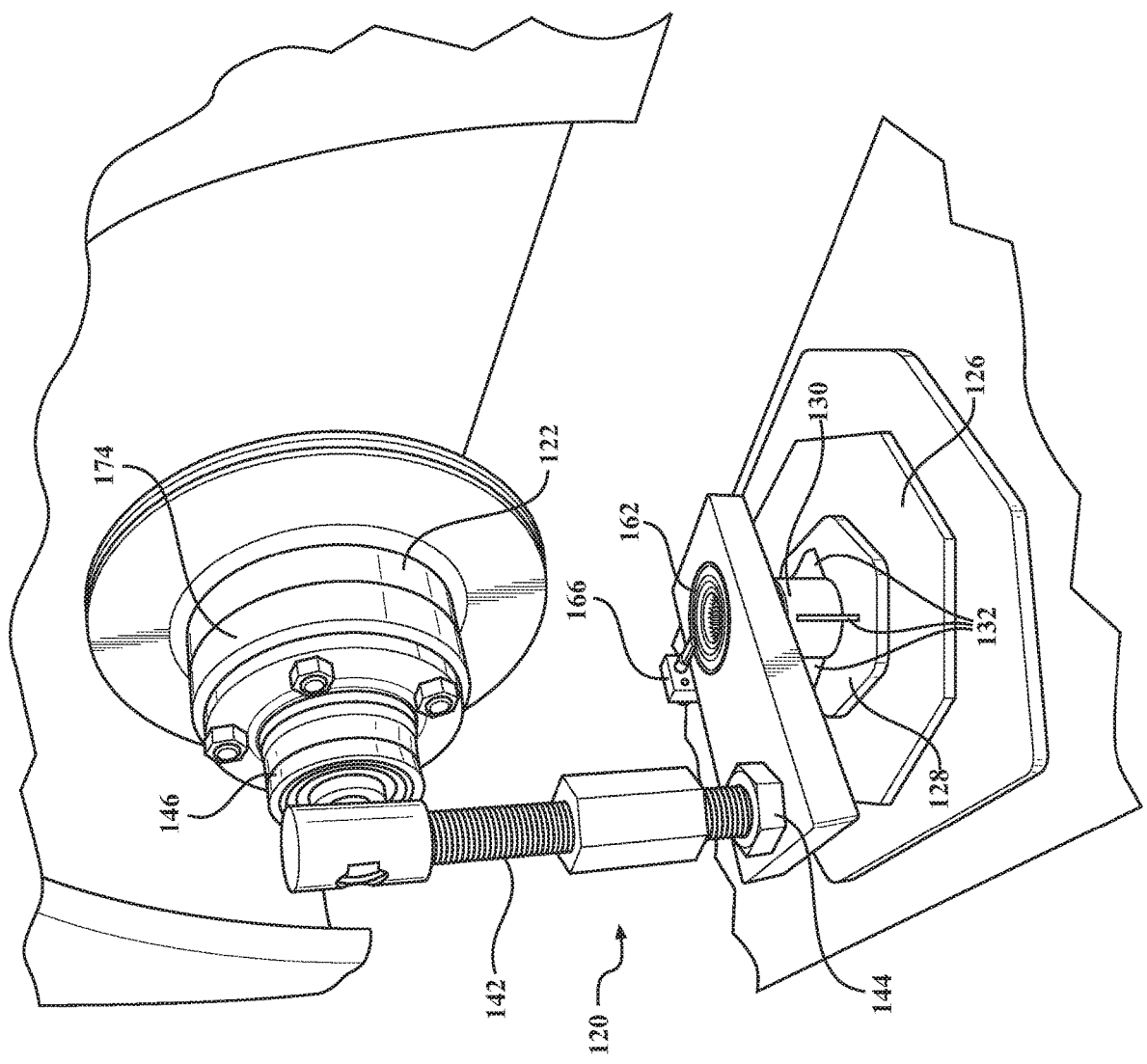
FIG. 10 is a perspective and fragmentary view showing the second embodiment of the jack stand assembly attached with the wheel hub of a vehicle.

Referring now to FIGS. 8-10 wherein like numerals, separated by a prefix of "1", identify corresponding parts with the first embodiment described above, a second exemplary embodiment of a jack stand assembly 120 is generally shown. In the second embodiment, a bearing 162 is disposed between the stand 130 and a horizontal plate 164 (as opposed to the horizontal arm found in the first embodiment). A sensor 166 is attached with the horizontal plate 164 and interacts with the bearing 162 to measure rotation of the horizontal plate 162 (and thus, the wheel hub 122 fixedly attached with the coupling plate 146) relative to the base 124 as the wheel of the vehicle is rotated in a steering motion. The sensor is in electrical communication with a transmitter (wireless or wired), which feeds data to an external device (not shown), such as a computer, that can monitor a toe adjustment operation.

Also in contrast to the first embodiment, the second embodiment includes a vertical shaft 142 which is threadedly attached with the horizontal plate 164 and which extends in spaced and parallel relationship with the stand 130 of the base 124. A hub pilot 168 is attached with one end of the vertical shaft 142 and extends transversely to the vertical shaft 142. The hub pilot 168 has a smooth cylindrical outer surface and may be attached with the vertical shaft 142 through any suitable means.

In this embodiment, the bearing 148 that allows the coupling plate 146 and wheel hub 122 to rotate about the horizontal axis $A_1$ (shown in FIG. 5) is contained in the coupling plate 146 itself and is thus detachable from the jack stand assembly 120. The bearing 148 has an inner race with a central opening that can be inserted onto the hub pilot 168. A distal end of the hub pilot 168 includes a bore with female threads for threadedly engaging a bolt which secures the coupling plate 146 with the hub pilot 168.

The vertical shaft 142 includes two separate threaded rods 142 and a coupling nut 172 which is attached with both. The threads of the two threaded rods 142 extend in opposite directions such that rotating the coupling nut 172 in one rotational direction causes the two threaded rods 142 to separate from one another and rotating the coupling nut 172 in an opposite rotational direction causes the two threaded rods 170 to move towards one another. Thus, the vertical height of the hub pilot 168 and the coupling plate 146 can be selectively increased and decreased by simply rotating the coupling nut 172. The coupling nut 172 is preferably provided with a hexagonally-shaped outer surface so that a conventional wrench can be used to rotate the coupling nut 172.

As shown in FIG. 10, the coupling plate 146 can be directly attached to the wheel hub 122 or rotor. Alternately, an adapter plate 174 (shown in FIG. 9) can be interposed between the coupling place 146 and the wheel hub 122. The adapter plate 174 has a plurality of through openings with specific shapes and locations so that it can be attached with wheel hubs that have different lug patterns. Thus, with the adapter plate 174, the same coupling plate 146 can be used with a range of different wheel hubs 122.

Referring now to FIG. 11, a third exemplary embodiment of the jack stand assembly 220 is generally shown with like numerals, separated by a prefix of "2", indicating corresponding parts with the first and second embodiments described above. In the third embodiment, a bearing assembly 276 is disposed at a top end of the vertical shaft 242 for allowing the wheel hub to tilt during a steering movement as occurs in some vehicles. Specifically, the bearing 276 includes a ball stud 278 extends along the horizontal axis $A_1$ from one end where it is abuts the coupling plate 246 to an opposite end. In between the two ends, the ball stud 278 is semi-spherically shaped and is in slidable contact with a semi-spherically shaped bearing surface 280 which allows the ball stud 278 to both rotate and articulate relative to the vertical shaft 242. A bolt 282 extends through a central passage in the ball stud 278 to threadedly engage the coupling plate 246. A spring 284 (such as a coil spring) is interposed between a head of the bolt 282 and the ball stud 278 and is compressed therebetween. The compression of the spring 284 is biases the bolt 282 in a direction away from the coupling plate 246. This maintains the coupling plate 248 in contact against the ball stud 278.

Obviously, many modifications and variations of the present invention are possible in light of the above teachings and may be practiced otherwise than as specifically described while within the scope of the appended claims. Additionally, it is to be understood that all features of all claims and all embodiments can be combined with each other as long as they do not contradict each other.

What is claimed is:

1. A jack stand assembly for a vehicle comprising:
   a coupling plate with a plurality of openings for receiving lugs of a wheel hub to fixedly attach said coupling plate with the wheel hub;
   a support structure operably supports said coupling plate, said support structure having a vertical height which is adjustable, and said support structure being configured to rotate about a vertical axis to allow the wheel hub to be rotated in a steering motion when the wheel hub is fixedly attached with said coupling plate; and
   a bearing operably interposed between said coupling plate and the support structure for allowing the wheel hub to rotate about a horizontal axis;
   wherein said support structure includes a bearing housing with a post that is threadedly engaged with another component of said support structure, and wherein said bearing housing has a through opening, and wherein said bearing is disposed in said through opening; and
   wherein said coupling plate has a projection which extends through said through opening of said bearing housing.

2. The jack stand assembly as set forth in claim 1 wherein said support structure includes at least two pieces that are threadedly connected with one another to allow adjustment of said vertical height of said support structure by threading one of said pieces into or out of the other of said pieces.

3. The jack stand assembly as set forth in claim 1 wherein said support structure includes a turnplate with a fixed platform and a movable platform that is able to move with low friction on said fixed platform.

4. The jack stand assembly as set forth in claim 1 wherein, when said coupling plate is fixedly attached with the wheel hub, said vertical axis that said support structure is rotatable about is generally aligned with a pair of ball joints that support the wheel hub on the vehicle.

5. A jack stand assembly for a vehicle comprising:
   a coupling plate with a plurality of opening for receiving lugs of a wheel hub to fixedly attach said coupling plate with the wheel hub;
   a support structure operably supporting said coupling plate, said support structure having a vertical height which is adjustable, and said support structure being configured to rotate about a vertical axis to allow the wheel hub to be rotated in a steering motion when the wheel hub is fixedly attached with said coupling plate; and
   a bearing operably interposed between said coupling plate and the support structure for allowing the wheel hub to rotate about a horizontal axis;
   wherein said support structure includes a bearing housing with a post that is threadedly engaged with another component of said support structure, and wherein said bearing housing has a through opening, and wherein said bearing is disposed in said through opening;
   wherein said support structure includes a turnplate with a fixed platform and a movable platform that is able to move with low friction on said fixed platform;
   wherein said support structure includes a support which is fixedly attached with said movable platform of said turnplate;
   wherein said support structure further includes a vertical arm which is fixedly attached with said support and extends in a vertical direction upwardly therefrom; and
   wherein said support structure further includes a horizontal arm which is attached with said vertical arm and which has an opening that is threadedly engaged with said post of said bearing housing.

* * * * *